United States Patent
Ikoma et al.

(10) Patent No.: US 7,239,344 B1
(45) Date of Patent: Jul. 3, 2007

(54) CAMERA AND DEVICE FOR SWITCHING OPTICAL FILTERS

(75) Inventors: Ken Ikoma, Yokohama (JP);
Kazushige Tamura, Yokohama (JP);
Makoto Takakuwa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 601 days.

(21) Appl. No.: 09/830,769

(22) PCT Filed: Aug. 31, 2000

(86) PCT No.: PCT/JP00/05934

§ 371 (c)(1),
(2), (4) Date: Apr. 30, 2001

(87) PCT Pub. No.: WO01/16649

PCT Pub. Date: Mar. 8, 2001

(30) Foreign Application Priority Data

Sep. 1, 1999 (JP) .............................. 11-248048

(51) Int. Cl.
H04N 5/225 (2006.01)
(52) U.S. Cl. .................... 348/216.1; 348/164
(58) Field of Classification Search ........ 348/162–172, 348/362, 342–344, 363, 369; 396/220, 235, 396/257, 258
See application file for complete search history.

(56) References Cited

U.S. PATENT DOCUMENTS

| | | | |
|---|---|---|---|
| 4,016,597 A * | 4/1977 | Dillon et al. ................ 348/266 |
| 4,437,111 A | 3/1984 | Inai et al. |
| 4,695,878 A | 9/1987 | Levine et al. |
| 4,945,367 A | 7/1990 | Blackshear |
| 5,172,220 A * | 12/1992 | Beis ........................... 348/262 |
| 5,903,700 A * | 5/1999 | Fukushima .................. 386/46 |
| 5,982,423 A | 11/1999 | Sekiguchi |
| 6,219,180 B1 * | 4/2001 | Hasegawa et al. .......... 359/387 |
| 6,336,587 B1 * | 1/2002 | He et al. ............... 235/462.45 |
| 6,611,289 B1 * | 8/2003 | Yu et al. ..................... 348/265 |

FOREIGN PATENT DOCUMENTS

| | | |
|---|---|---|
| JP | 59-101576 | 7/1984 |
| JP | 2-83538 | 6/1990 |
| JP | 4-18888 | 1/1992 |
| JP | 4-128471 | 11/1992 |

(Continued)

*Primary Examiner*—Vivek Srivastava
*Assistant Examiner*—Yogesh Aggarwal
(74) *Attorney, Agent, or Firm*—Pearne & Gordon LLP

(57) ABSTRACT

To provide an optical filter switching device for a camera in which a clear image can always be obtained during the day and at night.

In a cameral in which an image is formed on an image pick-up element (2) through a lens (1a) provided on a camera body (1) and is converted into an electric signal through the image pick-up element (2), thereby obtaining an image signal, optical filter switching means (3) for switching optical filters (3a) and (3b) depending on a level of the image signal is provided on a front surface of the image pick-up element (2) and a clear image can always be obtained during the day and at night. Therefore, in the case in which such a camera is used for a surveillance camera, the reliability of a monitoring system can be enhanced.

6 Claims, 4 Drawing Sheets

FOREIGN PATENT DOCUMENTS

| | | |
|---|---|---|
| JP | 5-110938 | 4/1993 |
| JP | 06-051186 | 2/1994 |
| JP | 06-082671 | 3/1994 |
| JP | 9-98322 | 4/1997 |
| JP | 10-112816 | 4/1998 |
| JP | 10-115858 | 5/1998 |
| JP | 11-95092 | 4/1999 |
| JP | 11-125852 | 5/1999 |
| JP | 11-196307 | 7/1999 |
| JP | 11-196308 | 7/1999 |
| JP | 11-202398 | 7/1999 |
| JP | 11239356 A * | 8/1999 |
| JP | 2000-59798 | 2/2000 |
| JP | 2000-162665 | 6/2000 |
| JP | 2000-224469 | 8/2000 |

* cited by examiner

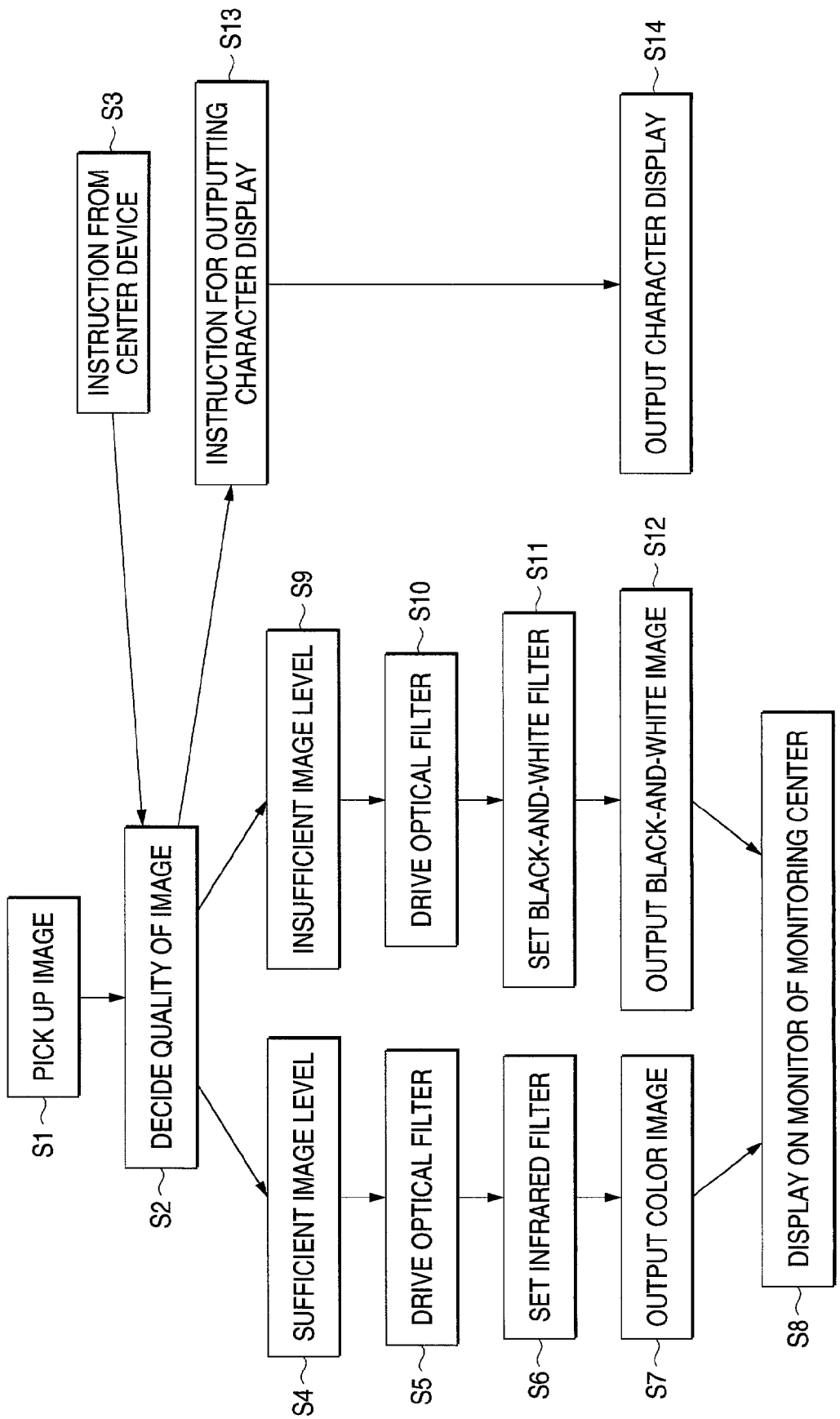

CAMERA AND DEVICE FOR SWITCHING OPTICAL FILTERS

TECHNICAL FIELD

The present invention mainly relates to a camera to be used for a surveillance camera and an optical filter switching method thereof.

BACKGROUND ART

Conventionally, a composite camera such as a dome camera has been used for a surveillance camera constituting a monitoring system.

The composite camera uses a semiconductor image pick-up element (which will be hereinafter referred to as an image pick-up element) such as a CCD or a C-MOS.

In the image pick-up element, a sensitivity of an infrared region is much higher than a visible light level. In order to obtain a color image, therefore, an infrared cut filter is provided on the front surface of the image pick-up element to cut unnecessary infrared rays.

On the other hand, the surveillance camera needs to continue monitoring for twenty-four hours. Therefore, it is necessary to use a composite camera having a great dynamic range capable of clearly obtaining a bright image during the day and a dark image at night. In the case in which the composite camera using the image pick-up element is utilized for the surveillance camera, the following drawbacks are caused.

In the case in which the composite camera using the image pick-up element is utilized for the surveillance camera, it is suitable for a color image having a large information volume during the day. Moreover, if a sensitivity is set to obtain a clear image during the day, the sensitivity is reduced at night so that a clear image cannot be obtained.

For this reason, conventionally, the sensitivity has been set such that a clear image can be obtained at night, and a quantity of light incident on the image pick-up element has been decreased by regulating a diaphragm opening or a shutter speed, thereby adjusting the sensitivity of the image pick-up element during the day.

According to such a method, however, means for regulating a diaphragm or a shutter is required. Consequently, there has been a drawback in that the structure of the camera becomes complicated or expensive.

In order to eliminate the conventional drawbacks, the invention has been made and has an object to provide a camera and an optical filter switching method in which a clear image can always be obtained during the day and at night.

DISCLOSURE OF THE INVENTION

In order to achieve the object, the invention provides (1) a camera for forming an image on an image pick-up element through a lens provided on a camera body and converting the image into an electric signal through the image pick-up element, thereby obtaining an image signal, wherein optical filter switching means for switching an optical filter is provided on a front surface of the image pick-up element depending on a level of the image signal.

According to the structure of the item (1), the image pick-up element in which a sensitivity is rapidly raised in an infrared region can also cut unnecessary infrared rays through the optical filter. Therefore, it is possible to obtain a clear image during the day and at night.

In order to achieve the object, the invention provides (2) the camera according to the item (1), wherein the optical filter is constituted by a color filter and a black-and-white filter, the optical filter is switched into the color filter to obtain a color image during the day with a high image signal level, and the optical filter is switched into the black-and-white filter to obtain a black-and-white image at night with a low image signal level.

According to the structure of the item (2), a color image having a large information volume is obtained during the day and an image signal of an infrared region is input through the black-and-white filter to rapidly enhance a signal level of a Y signal at night. Therefore, it is also possible to obtain a clear black-and-white image having a high contrast and S/N at night.

In order to achieve the object, the invention provides (3) the camera according to the item (1) or (2), wherein a level of the image signal output from the image pick-up element is detected by detecting means and the optical filter is automatically switched depending on the signal level thus detected.

According to the structure of the item (3), a monitoring system using a large number of composite cameras for a surveillance camera can also switch the optical filter automatically during the day and at night. Therefore, a complicated switching operation is not required so that the operability of the whole monitoring system can be enhanced, and furthermore, the monitoring system can be devoted to a monitoring work. Therefore, the reliability of the monitoring system can be enhanced.

In order to achieve the object, the invention provides (4) a method of switching an optical filter of a camera for forming an image on an image pick-up element through a lens provided on a camera body and converting the image into an electric signal through the image pick-up element, thereby obtaining an image signal, wherein a level of the image signal output from the image pick-up element is detected by detecting means and the optical filter is automatically switched through optical filter switching means provided on a front surface of the image pick-up element depending on the signal level detected by the detecting means.

According to the method of the item (4), a color image having a large information volume can be obtained during the day and a black-and-white image having a high contrast and S/N can be obtained at night. Therefore, in the case in which the camera is used as a surveillance camera, a clear image can be obtained during the day and at night so that the reliability of the monitoring system can be enhanced. In addition, since a monitoring system using a large number of cameras for a surveillance camera can also switch the optical filter automatically during the day and at night, a complicated switching operation is not required so that the operability of the whole monitoring system can be enhanced In order to achieve the object, the invention provides (5) the method of switching an optical filter of a camera according to the item (4), wherein the optical filter is constituted by a color filter and a black-and-white filter, the optical filter is switched into the color filter to obtain a color image during the day with a high image signal level, and the optical filter is switched into the black-and-white filter to obtain a black-and-white image at night with a low image signal level.

According to the method of the item (5), a color image having a large information volume is obtained during the day and an image signal of an infrared region is input through the black-and-white filter to rapidly enhance a signal level of a Y signal at night. Therefore, it is also possible to obtain a clear black-and-white image having a high contrast and S/N at night.

In order to achieve the object, the invention provides (6) the method of switching an optical filter of a camera according to the item (5), wherein in the case in which the optical filter is switched from the color filter into the black-and-white filter, character information indicating the switching is output through display means and is displayed together with an image on a monitor.

According to the method of the item (6), even if a color image is automatically switched into a black-and-white image, the fact of the switching is displayed in character information on a monitor. Therefore, it is possible to prevent the color image from being mistaken for the black-and-white image, thereby erroneously deciding that a camera body or a monitoring system has a failure.

In order to achieve the object, the invention provides (7) the method of switching an optical filter of a camera according to the item (6), wherein when an image pick-up environment in which the camera body picks up an image is detected by a sensor and a color image is automatically switched into a black-and-white image, character information about the black-and-white image is displayed on the monitor.

According to the method of the item (7), also in the case in which a bright object is locally present in the image pick-up environment so that the image pick-up environment cannot be decided from an image signal, the image pick-up environment can be grasped in response to a signal sent from the sensor to switch the optical filter. Therefore, it is possible to prevent the camera from malfunctioning due to a change in the environment.

BRIEF DESCRIPTION OF THE DRAWINGS

FIG. 6 is a flow chart showing a method of switching an optical filter of the composite camera according to the embodiment of the invention.

Figure 1:
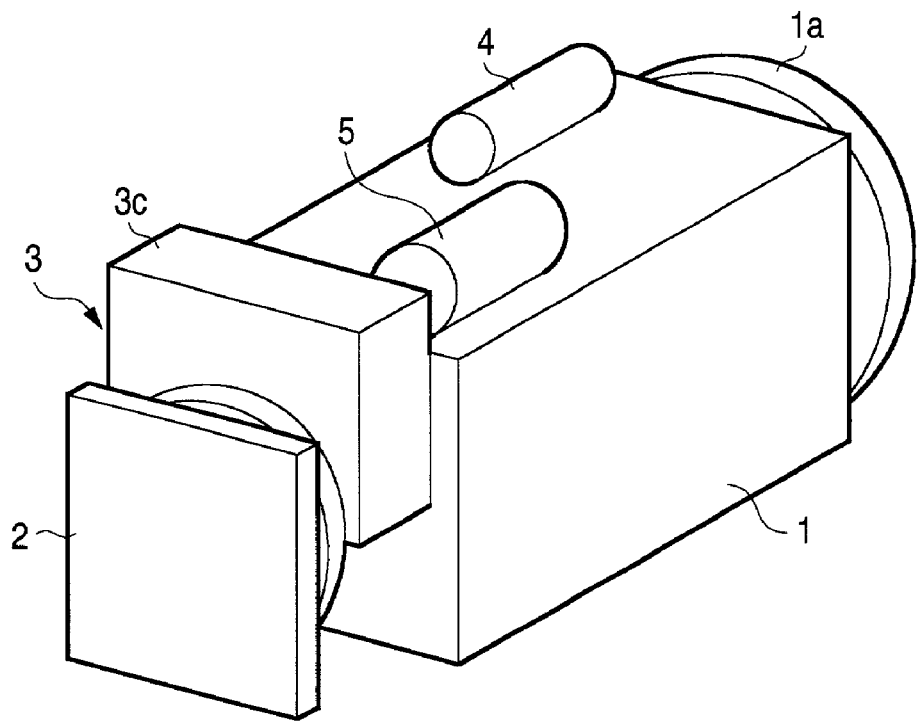
FIG. 1 is a perspective view showing a composite camera using an optical filter switching device according to an embodiment of the invention.

In the drawings, 1 denotes a camera body, 1a denotes a lens, 2 denotes an image pick-up element, 3 denotes optical filter switching means, 3a denotes a color filter, 3b denotes a black-and-white filter, 3c denotes a case, 4 denotes a focal driving motor, 5 denotes a filter switching motor, 5a denotes a pinion, 6 denotes a notch gear, 6a denotes a gear portion, 8 and 9 denote image amplifying circuits, 10 denotes an image signal transmission interface, 11 denotes a transmission path, 12 denotes detecting means, 13 denotes display means, and 14 denotes a sensor.

BEST MODE FOR CARRYING OUT THE INVENTION

An embodiment of the invention will be described in detail with reference to the drawings.

Figure 2:
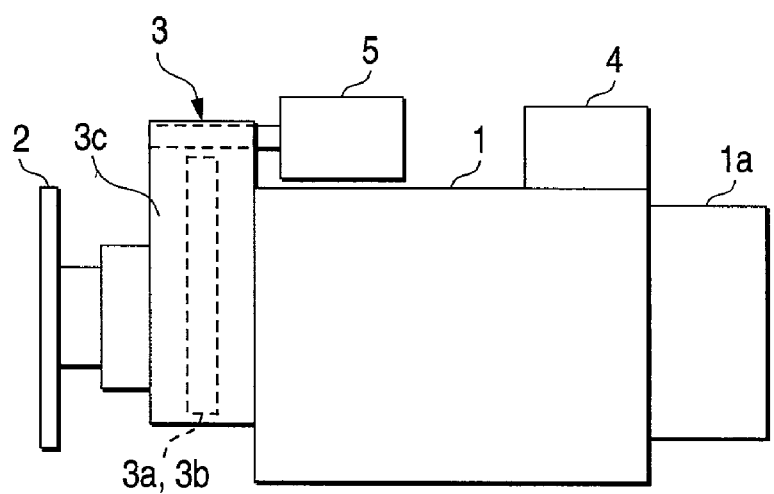
FIG. 2 is a side view showing the composite camera using the optical filter switching device according to the embodiment of the invention.
Figure 3:
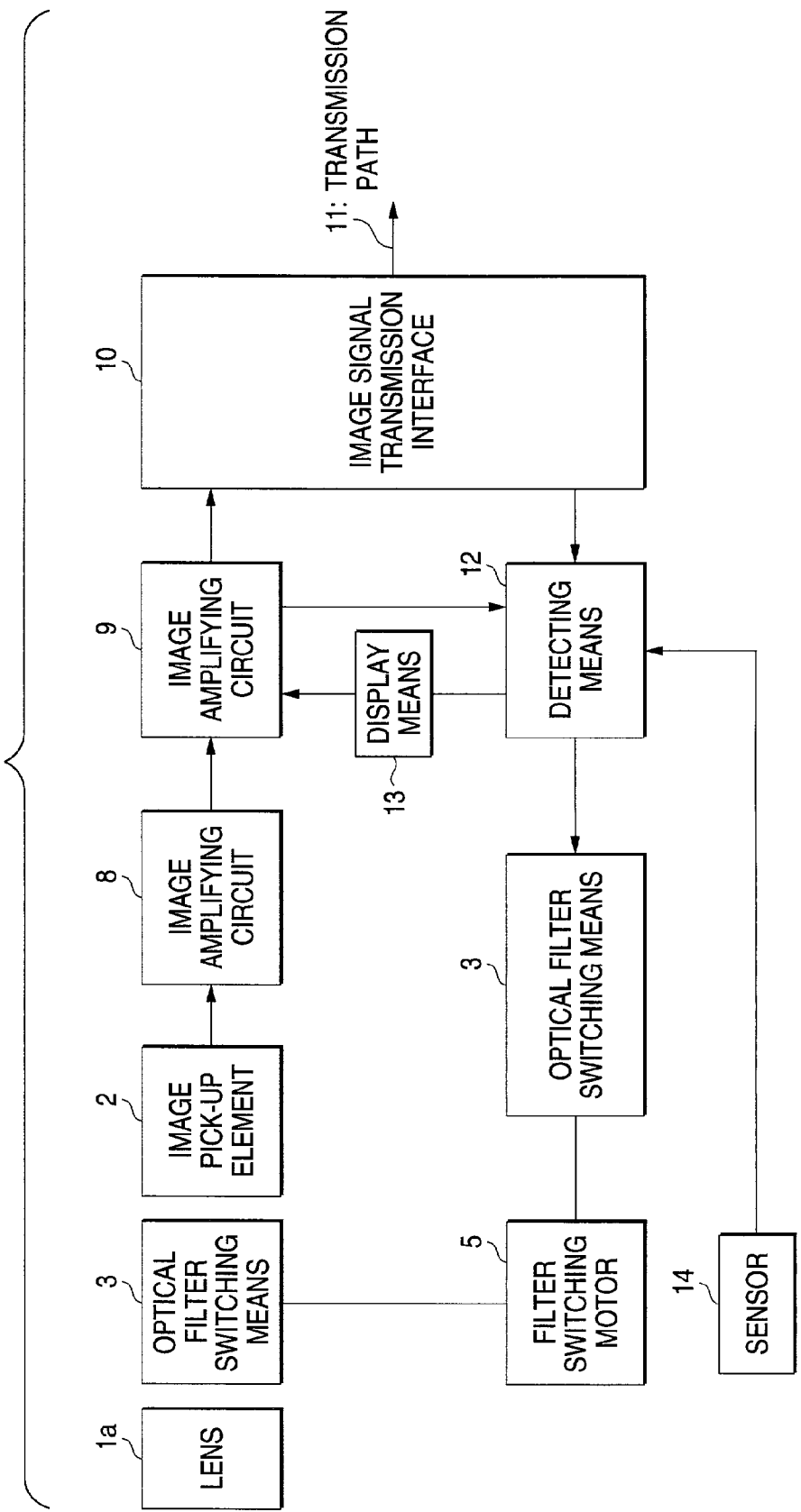
FIG. 3 is a block diagram showing a control system of the composite camera using the optical filter switching device according to the embodiment of the invention.
Figure 4A:
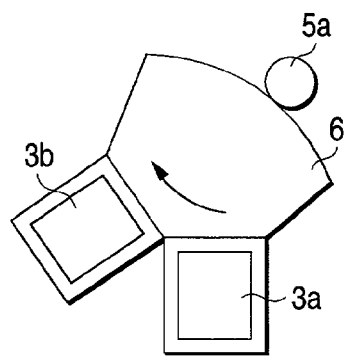
FIG. 4 is a view illustrating the action of the optical filter switching device for the composite camera according to the embodiment of the invention.
Figure 4B:
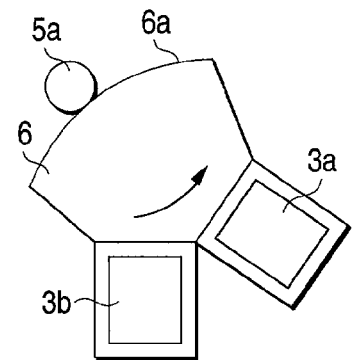
Figure 5:
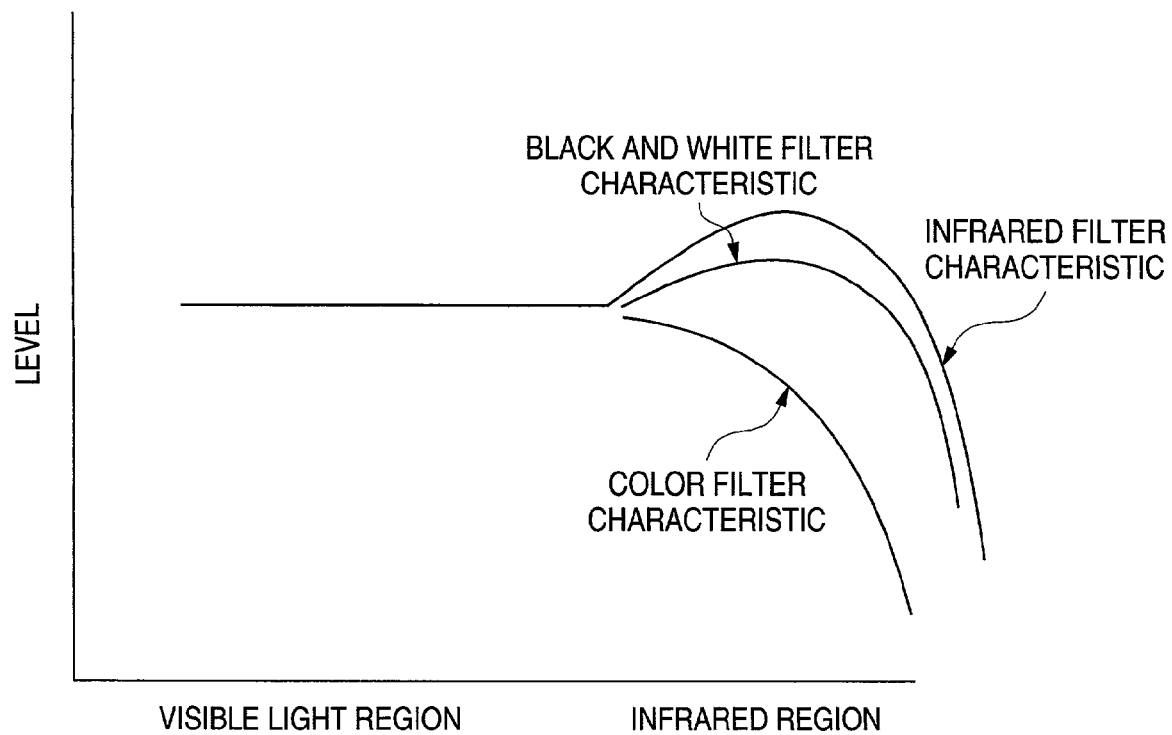
FIG. 5 is a chart showing a frequency characteristic of an image pick-up element used for the composite camera according to the embodiment of the invention.

FIG. 1 is a perspective view showing a composite camera to be used for a surveillance camera, FIG. 2 is a side view showing the same composite camera, FIG. 3 is a block diagram showing a control system, FIG. 4 is a view illustrating the action of an optical filter switching device, FIG. 5 is a chart showing a frequency characteristic of an image pick-up element, and FIG. 6 is a flow chart showing a method of switching an optical filter of the composite camera.

In FIGS. 1 and 2, a camera body 1 has a lens 1a provided on a front surface and an image pick-up element 2 provided on the rear surface side in a focal position of the lens 1a. An image is formed on an image pick-up element 2 through the lens 1a and optical filter switching means 3 is provided between the rear surface of the camera body 1 and the image pick-up element 2.

To an upper surface of the camera body 1 are attached a focal driving motor 4 of focal length regulating means (not shown) for automatically regulating a focal length of the lens 1a and a filter switching motor 5 for switching a color filter 3a and a black-and-white filter 3b which are provided in the optical filter switching means 3.

The color filter 3a and the black-and-white filter 3b are attached to the surrounding portion of a notch gear 6 accommodated in a flat square box-shaped case 3c as shown in FIG. 4.

The notch gear 6 is formed to have an almost fan shape, and a pinion 5a attached to the filter switching motor 5 is mated with a gear portion 6a. When the notch gear 6 is rotated in a right direction as shown in FIG. 4A through the pinion 5a by means of the filter switching motor 5, the color filter 3a fixed to the surrounding portion of the notch gear 6 is switched over the front surface of the image pick-up element 2. When the notch gear 6 is rotated in a left direction as shown in FIG. 4B, the black-and-white filter 3b is switched in the forward direction of the image pick-up element 2.

On the other hand, an image formed on the image pick-up element 2 through the lens 1a of the camera body 1 is converted into an electric signal through the image pick-up element 2, and the electric signal is then amplified by image amplifying circuits 8 and 9 of the control system shown in FIG. 3 and is transmitted through an image signal transmission interface 10 and a transmission path 11 to a monitoring center which is not shown and is partially detected through detecting means 12.

The detecting means 12 serves to detect that an image signal to be transmitted to the monitoring center is proper or not. If the image to be transmitted is proper for a color image, the detecting means 12 sends a detection signal to the optical filter switching means 3, thereby keeping the filter switching motor 5 in such a state that the color filter 3a is switched over the front surface of the image pick-up element 2. To the contrary, in the case in which a quantity of light is not sufficient at night and a clear color image cannot be obtained, the detecting means 12 sends a detection signal to the optical filter switching means 3 such that the image signal becomes proper, thereby controlling the filter switching motor 5 and outputting a filter switching signal to display means 13 such that the black-and-white filter 3b is positioned on the front surface of the image pick-up element 2.

The display means 13 previously stores character information. When a filter switching signal is input through the detecting means 12, character information such as "a black-and-white image is now displayed", for example, is transmitted to the monitoring center through the image amplifying circuit and the image signal transmission interface 10 in response to the input signal. Therefore, a monitor of the monitoring center displays the character information such as "a black-and-white image is now displayed" together with an image picked up by the camera body 1.

Moreover, a timer is provided in the display means 13. During the transmission of a black-and-white image, the character information is transmitted and displayed on a monitor of a monitoring room periodically on the basis of a time set by the timer or all the time. In addition, a front portion of the camera body 1 is provided with a sensor 14 for detecting the environment of a monitoring place where the camera body 1 is to pick up an image. Environmental conditions are transmitted to the detecting means 12 so that the optical filter switching means 3 can be prevented from malfunctioning due to a change in the environmental conditions.

More specifically, in the case in which a dark monitoring place is to be monitored through the surveillance camera, the detecting means 12 decides a white flower, white shoes or a street lamp in an image pick-up range to be a bright image, thereby malfunctioning.

In order to prevent the malfunction, the sensor 14 detects the environmental conditions of the monitoring place and transmits the information to the detecting means 12, thereby always switching the optical filter properly also in a place in which the season is changed or equipment provided in a monitoring place is varied.

A method of switching an optical filter of the composite camera having the structure described above will be described with reference to a flow chart shown in FIG. 6.

Referring to a frequency characteristic of the image pick-up element 2 used in the composite camera, a sensitivity of an infrared region is higher than that of visible light as shown in FIG. 5. In order to obtain a clearer image, therefore, it is necessary to provide an infrared cut filter on the front surface of the image pick-up element 2, thereby cutting unnecessary infrared rays.

On the other hand, a color image has a large information volume. Therefore, a color image is suitable for the image of the surveillance camera. However, the picture quality of the color image is more deteriorated during monitoring at night than that during the day. Moreover, less color information is obtained at night than that during the day. Therefore, the operation for monitoring a black-and-white image is less hindered.

In the invention, therefore, the color filter 3a is provided on the front surface of the image pick-up element 2 to cut unnecessary infrared rays in a light place during the day so that a clear color image can be obtained, and the color filter 3a is switched into the black-and-white filter 3b at night to obtain a clear black-and-white image.

More specifically, an image picked up by the camera body 1 at Step S1 of the flow chart shown in FIG. 6 is converted into an electric signal through the image pick-up element 2, and the electric signal is then amplified to have a proper level by the image amplifying circuits 8 and 9 and is transmitted to the monitoring center. In the case in which the detecting means 12 decides a level of an image signal at Step S2 and the image signal has a high level during the day, it is decided that an image level is sufficient at Step S4 and the processing proceeds to Step S5. The optical filter switching means 3 is operated at the Step S5, and the optical filter is switched such that the color filter 3a is positioned on the front surface of the image pick-up element 2 as shown in FIG. 4A at Step S6.

Then, a color image picked up by the image pick-up element 2 at Step S7 is transmitted to the monitoring center at Step S8 so that a color image is displayed on the monitor of the monitoring center. Therefore, it is possible to carry out monitoring in a monitoring place while watching a color image on the monitor.

On the other hand, in the case in which the image signal has a low level at night, it is decided that the image level is insufficient at Step S9 and the processing proceeds to Step S10. The optical film switching means 3 is operated at the Step S10, and the optical filter is switched such that the black-and-white filter 3b is positioned on the front surface of the image pick-up element 2 as shown in FIG. 4B at Step S11.

Then, a black-and-white image picked up by the image pick-up element 2 at Step S12 is transmitted to the monitoring center at the Step S8 and is displayed on the monitor of the monitoring center. At the same time, the detecting means 12 gives an instruction for outputting character information to the display means 13 at Step S13.

Consequently, the character information is transmitted to the monitoring center through the display means 13 and character information such as "a black-and-white image is now displayed" is displayed on the monitor of the monitoring center. Therefore, it is possible to prevent the image displayed on the monitor from being mistaken for a color image, thereby erroneously deciding that the camera body 1 or the monitoring system partially has a failure. In addition, an image picked up to have a high sensitivity of the infrared region through the black-and-white filter 3b is incident on the image pick-up element 2. Therefore, a Y signal of the image signal can have a sufficient level. Consequently, it is possible to obtain a clear black-and-white image having a high contrast.

At the Step S3 of the flow chart shown in FIG. 6, if the picture quality of a color image transmitted to the monitoring center is not sufficient, an instruction signal is sent at the Step S2 where a color image or a black-and-white image can be selected artificially.

More specifically, the detecting means 12 usually detects the level of an image signal sent to the monitoring center to automatically select a color image or a black-and-white image depending on a signal level. If the color image cannot have sufficient picture quality, the black-and-white image can be selected in response to an instruction given from the monitoring center.

In the embodiment, the optical filter switching means 3 is provided with the color filter 3a and the black-and-white filter 3b which can be switched. In the case of the black-and-white image, a clear image can be obtained even if the black-and-white filter 3b is not provided on the front surface of the image pick-up element 2. Therefore, the black-and-white filter 3b may be omitted and three or more filters may be provided to switch these filters in order to obtain a clearer image.

In this case, it is necessary to control a position such that each filter can be accurately switched over the front surface of the image pick-up element 2. As in the embodiment of the invention, if the filter switching motor 5 is used for the optical filter switching means 3, a predetermined filter can be positioned with high precision over the front surface of the image pick-up element 2 by controlling the filter switching motor 5. In addition, even if the position is shifted, it can be finely adjusted easily through the remote operation of the monitoring center and the switching speed of the filter can easily be changed in any case.

It is a matter of course that the invention can be embodied for other cameras as well as the composite camera described in the embodiment.

INDUSTRIAL APPLICABILITY

According to the invention, as described above in detail, the level of the image signal output from the image pick-up element is detected to switch the optical filter provided on the front surface of the image pick-up element depending on the signal level. Therefore, the optical filter is provided on the front surface of the image pick-up element in which a sensitivity is rapidly raised in an infrared region, thereby cutting unnecessary infrared rays. Consequently, a clear color image having a large information volume can be obtained during the day.

Moreover, in the case in which the image signal level is low at night, the image signal in the infrared region is input. Consequently, the signal level of the Y signal can rapidly be enhanced. Thus, it is possible to obtain a clear image having a high contrast and S/N at night.

By using the camera according to the invention as the surveillance camera of the monitoring system, therefore, a clear image can be obtained during the day and at night. Consequently, the reliability of the monitoring system can be enhanced. In addition, the optical filter is automatically switched depending on the level of the image signal. Also in a monitoring system constituted by a large number of surveillance cameras, therefore, it is not necessary to artificially switch the optical filter. Thus, the operability of the whole monitoring system can be enhanced and the monitoring system can be devoted to a monitoring work. Consequently, the reliability of the monitoring system can be enhanced.

The invention claimed is:

1. A camera comprising:
a lens provided on a camera body;
an image pick-up element for converting an image provided by the lens into an electrical image signal;
a first optical filter;
a second optical filter; and
optical filter switching mechanism for selectively positioning one of the first optical filter and the second optical filter in front of the image pick-up element based on a level of the image signal; and
an image signal transmission interface for outputting character information to a monitor for display thereon together with the image or another image shot by the camera, wherein the character information is indicative of which of the filters is positioned in front of the image pick-up element by the optical filter switching mechanism.

2. A camera according to claim 1,
wherein one of the first optical filter and the second optical filter is a color filter and the other is a black-and-white filter, and
wherein the color filter is switched to obtain a color image during the day with a high image signal level, and the black-and-white filter is switched to obtain a black-and-white image at night with a low image signal level.

3. A camera according to claim 1 or 2, further comprising detecting means which detects a level of the image signal output from the image pick-up element,
wherein the first optical filter and the second optical filter are automatically switched depending on the signal level thus detected.

4. A method of switching optical filters of a camera, said method comprising the steps of:
forming an image on an image pick-up element through a lens provided on a camera body;
converting the image into an electrical signal through the image pick-up element, thereby obtaining an image signal;
detecting a level of the image signal output from the image pick-up element;
selectively positioning one of a first optical filter and a second optical filter in front of the image pick-up element depending on the detected signal level;
outputting character information to a monitor including a screen, wherein the character information is indicative of which of the filters is positioned in front of the image pick-up element in the step of selectively positioning; and
displaying the character information, together with the image or another image shot by the camera, on the screen.

5. A method of switching optical filters of a camera according to claim 4,
wherein one of the first optical filter and the second optical filter is a color filter and the other is a black-and-white filter, and
wherein the color filter is switched to obtain a color image during the day with a high image signal level, and the black-and-white filter is switched to obtain a black-and-white image at night with a low image signal level.

6. A method of switching optical filters of a camera, according to claim 5,
wherein the character information indicates that a black-and-white image is displayed on the screen of the monitor, when said image shot by the camera is automatically switched from a color image to a black-and-white image after detecting an image pick-up environment.

* * * * *